United States Patent [19]

Miyata et al.

[11] Patent Number: 5,428,541
[45] Date of Patent: Jun. 27, 1995

[54] THROTTLE VALVE CONTROLLER FOR ENGINE SYSTEM

[75] Inventors: Hiroshi Miyata; Naoto Kushi, both of Toyota, Japan

[73] Assignee: Toyota Jidosha Kabushiki Kaisha, Toyota, Japan

[21] Appl. No.: 970,905

[22] Filed: Nov. 3, 1992

[30] Foreign Application Priority Data

Nov. 11, 1991 [JP] Japan .................. 3-294650

[51] Int. Cl.6 .............................. B60K 28/16
[52] U.S. Cl. ................ 364/426.03; 364/426.01; 180/197
[58] Field of Search ............... 180/197, 179; 364/426.02, 426.01, 426.03, 426.04, 424.01, 431.03, 431.05, 431.07

[56] References Cited

U.S. PATENT DOCUMENTS

| 5,031,716 | 7/1991 | Feldmann et al. | 364/426.02 |
| 5,109,819 | 5/1992 | Custer et al. | 123/399 |
| 5,117,934 | 6/1992 | Tsuyama et al. | 364/426.02 |
| 5,137,105 | 8/1992 | Suzuki et al. | 364/426.02 |
| 5,154,250 | 10/1992 | Murai | 180/179 |
| 5,193,506 | 3/1993 | Ironside et al. | 123/399 |
| 5,198,982 | 3/1993 | Kobayashi | 364/426.02 |
| 5,211,452 | 5/1993 | Okazaki et al. | 364/426.02 |
| 5,222,570 | 6/1993 | Kawamura et al. | 364/426.02 |
| 5,245,542 | 9/1993 | Itoh et al. | 364/426.02 |
| 5,255,193 | 10/1993 | Katayose et al. | 364/426.02 |
| 5,285,865 | 2/1994 | Sakita | 180/179 |
| 5,333,584 | 8/1994 | Kamio et al. | 123/399 |

FOREIGN PATENT DOCUMENTS

| 0315352 | 5/1989 | European Pat. Off. . |
| 0322790 | 7/1989 | European Pat. Off. . |
| 0338141 | 10/1989 | European Pat. Off. . |
| 3603765 | 8/1986 | Germany . |
| 3644138 | 7/1988 | Germany . |
| 61-115729 | 6/1986 | Japan . |
| 62-23831 | 1/1987 | Japan . |
| 1-152837 | 10/1989 | Japan . |

Primary Examiner—Kevin J. Teska
Assistant Examiner—Stephen J. Walder, Jr.
Attorney, Agent, or Firm—Kenyon & Kenyon

[57] ABSTRACT

A throttle valve controller includes a valve driving device for activating a throttle valve; which is disposed along a air-intake passage. A manipulation detector detects the amount of manipulation of an acceleration pedal by a driver. A drive controller regulates the valve driving device. The throttle valve controller further includes a wheel acceleration detector for detecting the actual rotational angular acceleration of the driving wheels, and a target value calculator for calculating a target value for the rotational angular acceleration of the driving wheels, as a function of the detected manipulation amount The drive controller controls the valve driving device in such a way that the actual rotational angular acceleration of the driving wheels is set equal to the target acceleration value from the target value calculator.

22 Claims, 10 Drawing Sheets

THROTTLE VALVE CONTROLLER FOR ENGINE SYSTEM

BACKGROUND OF THE INVENTION

1. Field of the Invention

The present invention generally relates to an engine system including a throttle valve, for use in vehicles with driving wheels. More particularly, this invention relates to a throttle valve controller for regulating the throttling angle in order to control the rotational acceleration of the driving wheels.

2. Description of the Related Art

Several conventional attempts have been made to control slippage between the driving wheels, that provide traction to the vehicle, and the road surface, so as to optimize the driving control of the vehicle. The Japanese Unexamined Patent Publication No. 61-115729 illustrates such a conventional attempt. It discloses an acceleration slip controller which regulates the transmission torque to the driving wheels, as a function of the rotational conditions of the driving wheels such as the rotational speed. The objective of this controller is to establish a substantial frictional force between the driving wheels and the road surface.

This conventional controller includes two throttle valves provided in the air-intake system. A main throttle valve is linked to the acceleration pedal, that is manipulated by a driver. A secondary throttle valve, of a linkless type, is activated by a stepping motor. When the acceleration of the engine is increased by a corresponding manipulation of the acceleration pedal, the angle of the secondary throttle valve is controlled by the rotational conditions of the driving wheels. In turn, the throttling angle regulates the engine power output for optimizing the acceleration slip control, or traction control.

Thus, when slippage occurs, the angle of the secondary throttle valve is automatically controlled to vary the engine power, regardless of the manipulation of the acceleration pedal by the driver. Consequently, the driver loses control of the rotational acceleration of the driving wheels, and will detect a somewhat slow driving response.

Once acceleration slippage occurs, the conventional controller automatically controls the angle of the secondary throttle valve, such that the ratio of the acceleration slippage is thereafter maintained at a predetermined value. As a result, the rotation of the driving wheels is no longer directly controlled by the acceleration pedal or the driver. As the vehicle slowly accelerates on slippery road surfaces, if the driver responds by thrusting the acceleration pedal further, the vehicle will not promptly respond. This lack of immediate control is troublesome to the driver, who might start panicking in times when he should be in full control of his senses, and the vehicle.

SUMMARY OF THE INVENTION

Accordingly, it is a primary objective of the present invention to provide a throttle valve controller which enables direct control of the engine, by the driver, under various driving conditions, including slippage of the driving wheels. Particularly, this invention aims to provide a throttle valve controller which controls the rotational acceleration of the driving wheels, and accounts for the driver's desire to manage and respond to various driving conditions.

To achieve the foregoing and other objects and in accordance with the purpose of the present invention, an improved throttle valve controller is provided for use in a vehicle engine system. The engine system includes an engine that is connected to the driving wheels. A throttle valve is provided in an air-intake passage for supplying air to the engine. An adjustor or acceleration pedal is manipulable by the driver to control engine power output. The throttle valve controller includes a valve driving device for activating the throttle valve. A manipulation detector detects the amount of manipulation of the adjustor by the driver. A drive controller regulates the valve driving device. The throttle valve controller further includes a wheel acceleration detector for detecting the actual rotational angular acceleration of the driving wheels, and a target value calculator for calculating a target value for the rotational angular acceleration of the driving wheels, as a function of the detected manipulation amount. The drive controller controls the valve driving device in such a way that the actual rotational angular acceleration of the driving wheels that is detected by the wheel acceleration detector, becomes the target acceleration value calculated by the target value calculator.

It is preferable that the throttle valve controller of this invention include one or more of the following additional detectors: a wheel speed detector for detecting the actual rotational angular speed of the driving wheels; a slippage detector for detecting the slippage condition of the road surface; and a transmission level detector for detecting the number of speeds of a transmission disposed between the engine and the driving wheels.

The target value calculator calculates the target value of the rotational angular acceleration of the driving wheels, as a function of the detection values by the foregoing additional detectors.

It would also be preferable that the target acceleration value be determined as follows:

(a) As the adjustor is thrust further, the target acceleration value increases;

(b) As the wheels rotate at higher speeds, the target acceleration value decreases;

(c) As slippage of the driving wheels on the road surface becomes easier or more likely to occur, the target acceleration value decreases; and (d) As the number of speeds increases, the target acceleration value decreases.

When the engine system is equipped with a coupling mechanism for selectively coupling the engine to, or for disconnecting it from the driving wheels, it would be preferable that the throttle valve controller further include a coupling state detector for detecting whether the engine is connected to, or disconnected from the driving wheels. Consequently, the drive controller will control the valve driving device, in accordance with the coupling state between the engine and the driving wheels.

When the engine is coupled to the driving wheels by means of the coupling mechanism, the drive controller controls the valve driving device such that the actual rotational angular acceleration of the driving wheels, detected by the wheel acceleration detector, becomes the target acceleration value computed by the target value calculator. When the engine is not coupled to the driving wheels by means of the coupling mechanism, the drive controller controls the valve driving device, regardless of the actual rotational angular acceleration of the driving wheels. This will promptly increase the engine rotational speed when the engine is racing.

BRIEF DESCRIPTION OF THE DRAWINGS

The features of the present invention that are believed to be novel are set forth with particularity in the appended claims. The invention, together with objects and advantages thereof, may best be understood by reference to the following description of the preferred embodiments together with the accompanying drawings, in which:

FIG. 1 is a schematic plan view of a gasoline engine system used in the vehicle;

FIG. 2 is a block diagram illustrating an electronic control unit (ECU) and other components, for use in the vehicle of FIG. 1;

FIGS. 3 and 4 each are flowcharts illustrating a throttle valve control routine that is executed by the ECU of FIG. 2;

FIG. 5 is a time graph illustrating the relationship between an acceleration pedal angle and wheel rotational speed in the vehicle of FIG. 1; and FIG. 6 is a flowchart illustrating a neutral control routine executed by the ECU of FIG. 2;

DETAILED DESCRIPTION OF THE PREFERRED EMBODIMENTS

The six embodiments of the present invention will be described in detail. The basic mechanical and electrical designs of a throttle valve controller embodying the present invention, will be explained in the following description of the first embodiment. The remaining five embodiments will thereafter be described only in relation to the distinguishing features over the first embodiment.

(First Embodiment)

Figure 1:
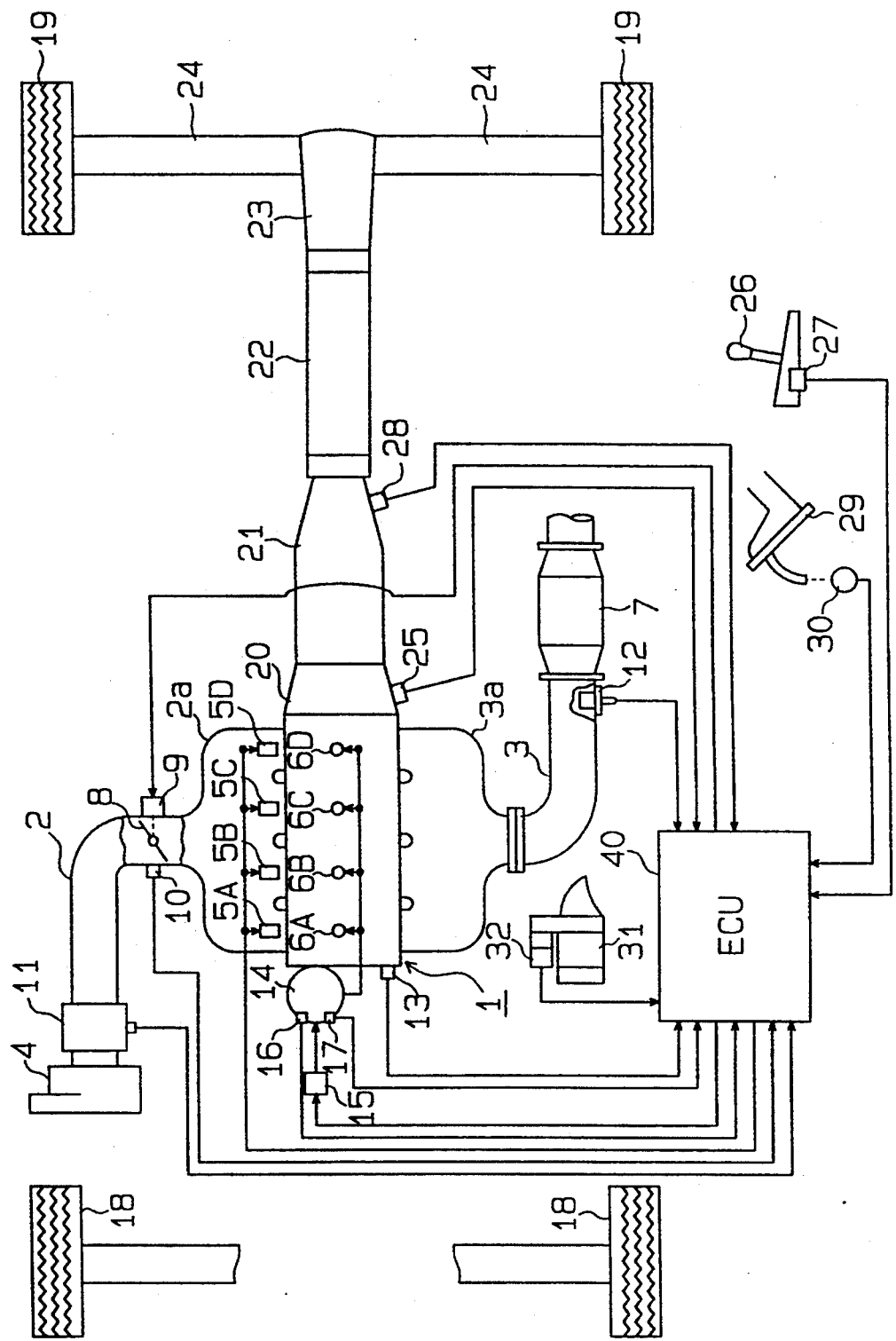
FIGS. 1 through 6 illustrate a first embodiment of the present invention in use in a vehicle having a front engine rear drive (FR) system, as follows.

The first embodiment of the present invention will now be described referring to FIGS. 1 through 6. As shown in FIG. 1, an engine 1 such as a four-cylinder engine, is mounted in a vehicle, and has an air-intake passage on system 2, and an exhaust passage or system 3. An air cleaner 4 is disposed on the inlet side of the air-intake passage 2. At its other end, the air-intake passage 2 is connected to individual cylinders of the engine 1, via a branched intake manifold tube 2a. Fuel injectors 5A, 5B, 5C and 5D are provided for the individual cylinders. As is well known in the field, pressurized fuel is supplied from a fuel tank (not shown) to the injectors 5A to 5D, by means of a fuel pump (not shown).

The cylinders are provided with ignition plugs 6A, 6B, 6C and 6D, respectively. The exhaust passage 3 communicates, via a branched exhaust manifold tube 3a, with the cylinders 5A, 5B, 5C, 5D. A three way catalytic converter 7 is disposed on the outlet side of the exhaust passage 3.

Outside air is supplied, via the air-intake passage 2, to the engine 1 via the air cleaner 4. Fuel is injected into the intake manifold tube 2a from the injectors 5A–5D, simultaneously with the supply of air. The fuel and air mixture is supplied to the cylinders, where it is caused to be explosively burnt by the ignition plugs 6A to 6D. The exhaust gas is led to the exhaust passage 3, is purified by the catalytic converter 7, and is thereafter discharged.

A linkless type throttle valve 8 is provided midway along the air-intake passage 2. The support shaft of the throttle valve 8 is coupled to the output shaft of a direct current (DC) motor 9 provided in the vicinity of the support shaft. As the throttle valve 8 is adjustably manipulated by the DC motor 9, between an opening and a closing position, the amount of air supplied to the individual cylinders via the air-intake passage 2 (hereinafter called "amount of intake air Q") is adjusted accordingly.

A throttle sensor 10 is provided in the proximity of the throttle valve 8. It detects the angle of the throttle valve 8, and thus the actual valve angle (hereinafter referred to as "throttle angle TA"). An air-flowmeter 11 is provided upstream of the air-intake passage 2, and detects the volume of air passing through the passage 2 (the amount of intake air Q). An oxygen sensor 12 is provided midway, along the exhaust passage 3, and detects the density of oxygen, Ox, in the exhaust gas (i.e., the air-fuel ratio in the exhaust passage 3). The engine 1 has a coolant temperature sensor 13 for detecting the temperature of the coolant (THW).

The ignition control of the individual ignition plugs 6A to 6D is done by means of a distributor 14 and an igniter 15. The distributor 14 distributes a high voltage output from the igniter 15 to the individual ignition plugs 6A–6D, in accordance with the crank angle of the engine 1. The ignition timings of the individual ignition plugs 6A–6D are determined by the high voltage at the output of the igniter 15.

The distributor 14 has an engine sensor 16, which detects the number of revolutions of the engine 1 (NE), as a function of the rotation of a timing rotor (not shown) provided in the distributor 14. The distributor 14 also has a timing sensor 17, which detects a change in the crank angle of the engine 1, as a function of the rotation of the timing rotor, and outputs a detection signal at a given timing interval. In the engine 1 of this embodiment, a sequence of strokes (suction stroke, compression stroke, combustion and expansion stroke, and exhaust stroke) are carried out, while the crank shaft rotates twice. The timing sensor 17 is adjusted to output a detection signal every complete revolution, i.e. crank angle of 360°.

The vehicle has a pair of front wheels and a pair of rear driving wheels 19. The front wheels 18 are controlled by a steering wheel (not shown). The crank shaft of the engine 1 is drivably coupled, via a clutch 20, to a manual shift transmission 21. This transmission 21 is connected to the individual driving wheels 19, via a propeller shaft 22, a differential gear 23 and a pair of right and left drive shafts 24.

The clutch 20 is actuated by a clutch pedal (not shown). This clutch 20 has a clutch sensor 25 which detects the actuation (ON/OFF state) of the clutch 20, and outputs a clutch signal (CS) indicative of that state. That is, the clutch sensor 25 detects if power is transmitted to the driving wheels 19 from the engine 1.

A shift lever 26 causes the manual shift transmission 21 to be switched between several speeds, such as a first, second, third and fourth speeds, and a neutral and rear positions. A shift position sensor 27 is provided in the vicinity of the shift lever 26, for detecting shifts in the position of the lever 26, and for outputing a corresponding shift position signal (SPS).

The manual shift transmission 21 further includes a wheel rotation sensor 28 for detecting the actual rotational angular speed $V\omega$ of the driving wheels 19 (hereinafter simply called "rotational speed $V\omega$"). The wheel rotation sensor 28 is provided with an electromagnetic pickup, so that it outputs a signal corresponding to the average rotational speed of the right and left driving wheels 19, based on the rotation of the gear that rotates with the output shaft of the manual shift transmission 21. The actual rotational angular acceleration $A\omega$ of the driving wheels 19 (hereinafter simply called "rotational acceleration $A\omega$") can be computed from the output of the sensor 28.

Further, the coefficient of road friction ($\mu$) is predicted on the basis of the actual throttle angle TA detected by the throttle sensor 10 and the wheel rotational acceleration $A\omega$. The wheel rotation sensor 28 may simultaneously detect the actual rotational speed $V\omega$ and the actual rotational acceleration $A\omega$ of the driving wheels 19.

An acceleration pedal 29 which is thrust by the driver is provided at the driver's seat. An acceleration pedal sensor 30 is provided close to the acceleration pedal 29, for detecting the acceleration pedal angle (ACCP). The pedal sensor 30 measures the thrust force on the acceleration pedal 29 during normal driving conditions, and the variations in the position of the acceleration pedal 29, during acceleration.

The engine 1 has a starting motor 31 for starting the engine 1. The starting motor 31 is well known in the art, and is turned on or off by the ignition switch (not shown). The starting motor 31 has a starting motor sensor 32 for detecting the ON/OFF state of the starting motor 31. The starting motor sensor 32 outputs a starter signal (STS), when the starting motor 31 is driven by activating the ignition switch.

Figure 2:
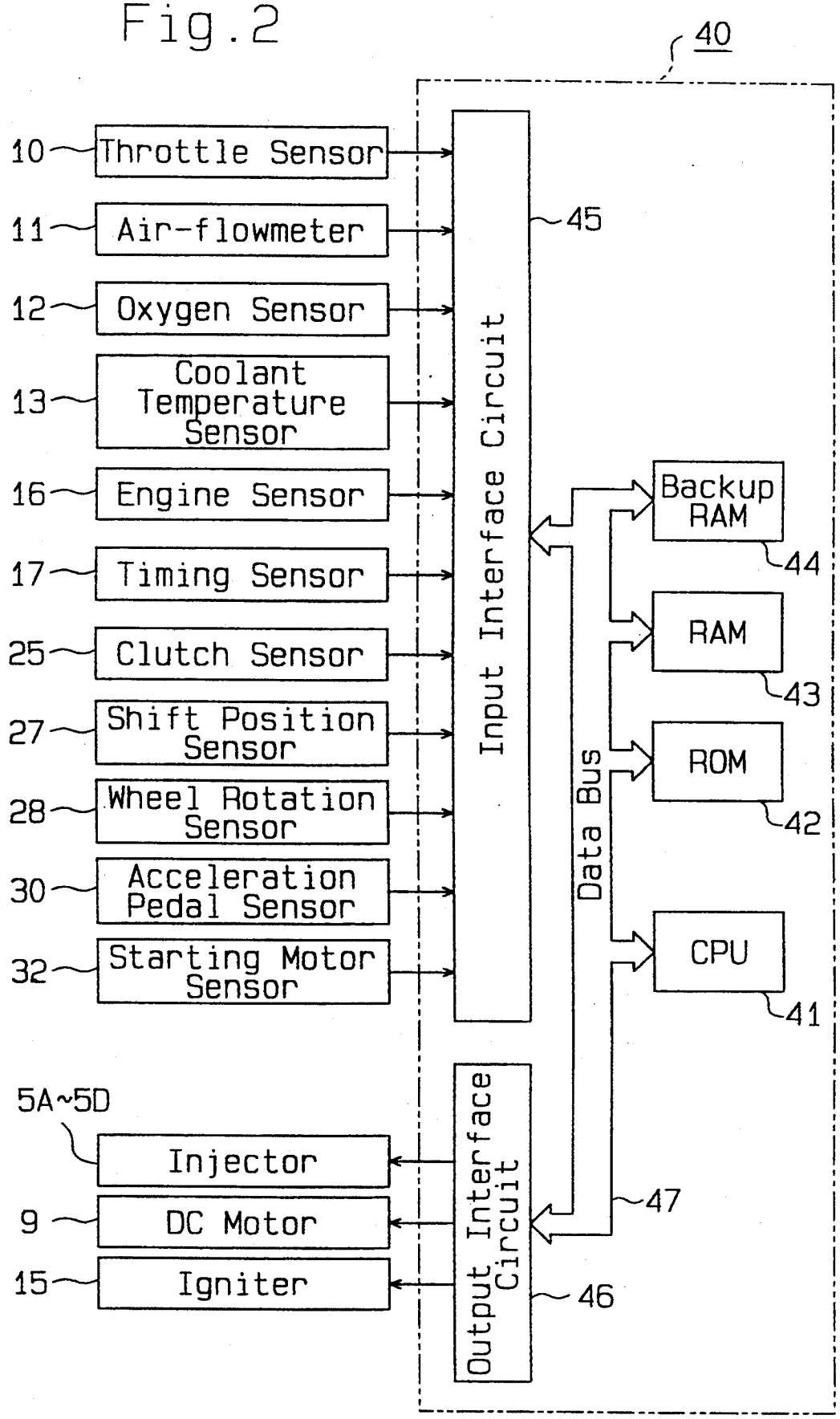

The engine system of the present embodiment has an electronic control unit (ECU) 40 which performs the general control functions of the engine and the associated components. As shown in FIG. 2, the ECU 40 includes a central processing unit (CPU) 41, a read only memory (ROM) 42 in which a control program is stored, a random access memory (RAM) for temporary storage of the results of operations done by the CPU 41, a backup RAM 44 for saving pre-stored data, an input interface circuit 45, an output interface circuit 46, and a data bus 47 for inter connecting the foregoing components of the ECU 40. These components and the data bus form a logical operation circuit.

The sensors, such as the throttle sensor 10, air-flowmeter 11, oxygen sensor 12, coolant temperature sensor 13, engine sensor 16, timing sensor 17, clutch sensor 25, shift position sensor 27, wheel rotation sensor 28, pedal sensor 30 and starting motor sensor 32, are connected, via the input interface circuit 45, to the ECU 40. Similarly, the actuators, such as the injectors 5A–5D, DC motor 9 and igniter 15, are connected, via the output interface circuit 46, to the ECU 40. The ECU 40 controls the drive timings of the actuators, based on the input signals from the sensors.

In other words, the ECU 40 computes the basic amount of injection fuel to be supplied to the engine 1, based on the amount of intake air Q and the number of revolutions of the engine or the engine speed NE, which are detected by the air-flowmeter 11, the engine sensor 16 and the like. The ECU 40 compensates for the computed basic amount of fuel injection, based on the oxygen density Ox detected by the oxygen sensor 12, to compute the final amount of fuel injection. The ECU 40 controls the individual injectors 5A–5D, based on the actual amount of fuel injection, to supply the necessary amount of fuel to the individual cylinders, depending upon the driving conditions.

The ECU 40 computes the optimal ignition timing, based on the amount of intake air Q, the engine speed NE, etc., while referring to a data map or similar data, previously stored in the ROM 42. The ECU 40 controls the igniter 15, based on the computed ignition timing, to ignite the ignition plugs 6A–6D, depending upon the driving conditions.

Further, the ECU 40 computes the target acceleration of the driving wheels 19 based on data, such as the engine speed (NE), clutch signal (CS), shift position signal (SPS), wheel rotational speed ($V\omega$), acceleration pedal angle (ACCP) and starter signal (STS), these data are acquired from the engine sensor 16, clutch sensor 25, shift position sensor 27, wheel rotation sensor 28, pedal sensor 30 and starting motor sensor 32, respectively. The foregoing data are also indicative of variations in the position of the acceleration pedal 29, and reflect the driver's intention to control the vehicle acceleration.

The ECU 40 calculates the actual rotational acceleration of the driving wheels 19 from the wheel rotational speed $V\omega$, and controls the DC motor 9, in such a way that this actual rotational acceleration becomes the computed target acceleration. Thus, the angle of the throttle valve 8 is controlled accordingly, to adjust the power of the engine 1.

Figure 3:
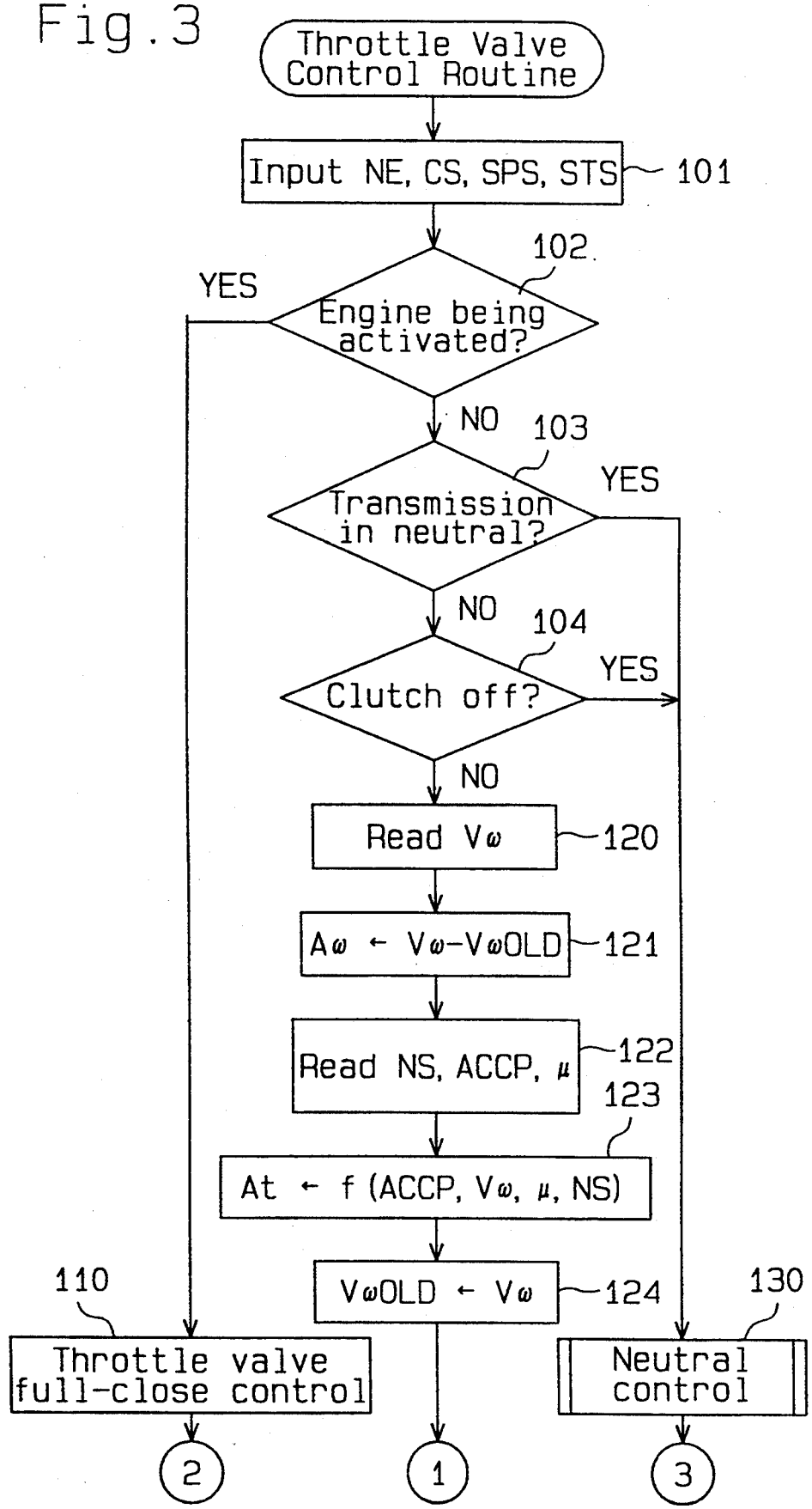
Figure 4:
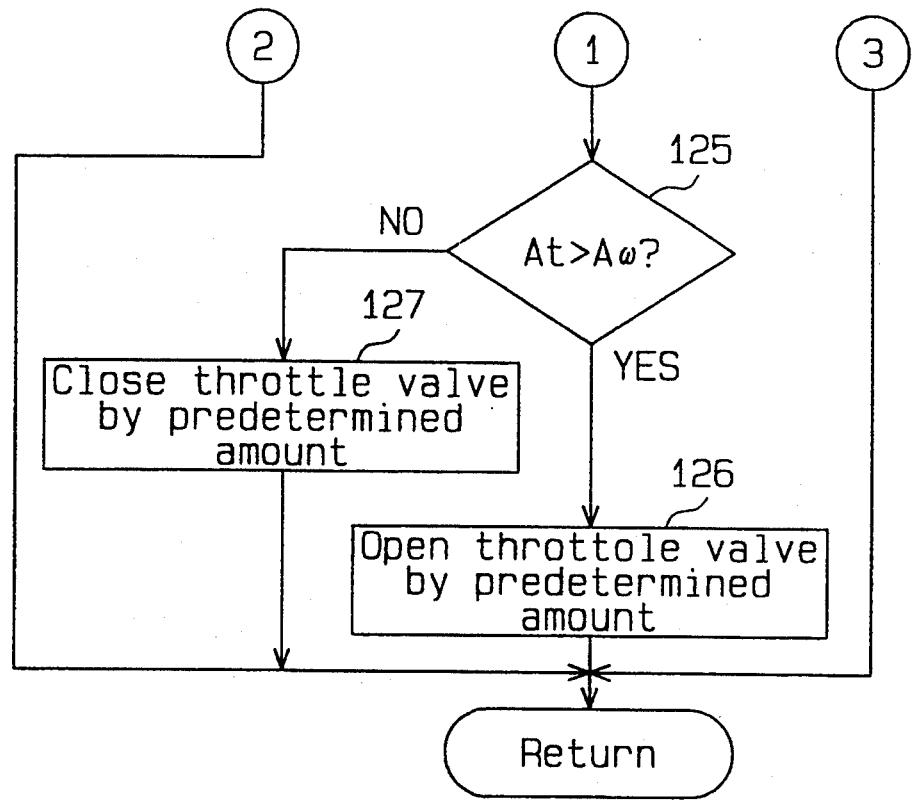

The procedures for controlling the angle of the throttle valve 8 will now be described with reference to the throttle valve control routine illustrated in FIGS. 3 and 4. The throttle valve control according to this routine is executed as interruption based on a regular interruption request issued to the CPU 41 every given period.

When the process according to this routine starts based on the interruption request, the ECU 40 first receives the engine speed (NE), clutch signal (CS), shift position signal (SPS) and starter signal (STS) (step 101). The ECU 40 determines if the engine 1 is being activated based on the input data (step 102). According to the present embodiment, the engine 1 is considered to be activated when the following two conditions are satisfied. The first condition is that the engine speed (NE) is "400 rpm" or slower, and the second is that the starter signal (STS) is "enabled (ON)". If the engine 1 has started, the ECU 40 drives the DC motor 9 to fully close the throttle valve 8 (step 110), and then terminates the interruption.

If the engine 1 is not being activated, then the ECU 40 determines whether the shift position of the manual shift transmission 21 is in the "neutral" position, based on the shift position signal (SPS) (step 103). If the shift position is other than in the "neutral" position, the ECU 40 determines whether the clutch 20 is off, that is whether the drive power is transmitted to the manual shift transmission 21 from the engine 1 (step 104). If the clutch 20 is on, it is determined that the drive power has been transmitted to both driving wheels 19 from the engine 1. At that time, the ECU 40 executes steps 120 to 127 which will be explained below.

More specifically, the ECU 40 reads data about the wheel rotational speed $V\omega$ based on the detection signal from the wheel rotation sensor 28 (step 120). Next, the ECU 40 calculates the difference between the wheel rotational speed $V\omega$ and a previous wheel rotational speed $V\omega OLD$, which is the speed at the time of the previous interruption control, and sets the result of the computation as the actual wheel rotational acceleration $A\omega$ (step 121).

The ECU 40 then reads data about the number of speeds (NS) based on the detection signal from the shift position sensor 27, the acceleration pedal angle (ACCP) and the coefficient of road surface friction ($\mu$) (step 122). The coefficient of the road surface friction ($\mu$) is an estimated value acquired through the computation that is carried out according to a separate calculation program for dividing the actual acceleration pedal angle (TA), based on the detection signal from the throttle sensor 10 by the wheel rotational acceleration ($A\omega$).

The ECU 40 computes a target wheel angular acceleration (At)(hereinafter simply called "target acceleration (At)"), based on a function f(ACCP, $V\omega$, $\mu$, NS) having the acceleration pedal angle (ACCP), wheel rotational speed ($V\omega$), coefficient of road friction ($\mu$) and number of speeds (NS) as its parameters (step 123). In other words, the target acceleration of the driving wheels 19 is calculated in accordance with the acceleration pedal angle (ACCP) that reflects the driver's intention, the wheel rotational speed ($V\omega$) at that time, the coefficient of the road surface friction ($\mu$) and the number of speeds (NS) selected from the first to fourth speeds.

The function f(ACCP, $V\omega$, $\mu$, NS) has the following four characteristics:

1) Increasing the target acceleration (At) as the acceleration pedal angle (ACCP) increases;
2) Decreasing the target acceleration (At) as the wheel rotational speed ($V\omega$) increases;
3) Decreasing the target acceleration (At) as the coefficient of the road surface friction ($\mu$) becomes smaller; and
4) Decreasing the target acceleration (At) as the number of speeds of the manual shift transmission 21 increases (i.e., in the direction from the first speed to the fourth speed).

There are various ways to set the function f(ACCP, $V\omega$, $\mu$, NS). The following may be the simplest way. Four basic functions $f_1$(ACCP), $f_2$($V\omega$), $f_3$($\mu$) and $f_4$(NS) each having a single parameter are set for the respective parameters, and the function f(ACCP, $V\omega$, $\mu$, NS) is defined as a product of those basic functions. The solutions of the basic functions corresponding to the values of the parameters are previously stored in four data map regions secured for the respective basic functions in the ROM 42. The solutions of the basic functions corresponding to the values of the parameters are searched, with reference to the associated data maps. The four solutions are then multiplied, for resolving the function f(ACCP, $V\omega$, $\mu$, NS). After computing the target acceleration (At), the ECU 40 sets the wheel rotational speed ($V\omega$) that was read in the current interruption as an old (previous) wheel rotational speed ($V\omega OLD$), and which will be used in the next interruption (step 124).

Then, the ECU 40 determines if the acquired target wheel acceleration (At) is greater than the actual wheel rotational acceleration ($A\omega$) (step 125). When the target acceleration (At) is greater than the actual acceleration ($A\omega$), the ECU 40 drives the DC motor 9 to open the throttle valve 8 by a predetermined amount (step 126). When the target acceleration (At) is equal to, or smaller than the actual acceleration ($A\omega$), the ECU 40 drives the DC motor 9 to reduce the opening of the throttle valve 8 by a predetermined amount (step 127). The power of the engine 1 is thus controlled based on the opening or closing control of the throttle valve 8, so that the actual rotational acceleration ($A\omega$) of the driving wheels 19 approaches the target acceleration (At). After executing the process of step 126 or 127, the ECU 40 terminates the interruption.

If the shift position of the manual shift transmission 21 is in the "neutral" position (step 103), or if the clutch 20 is off (step 104), the drive power from the engine 1 has not been transmitted to the manual shift transmission 21. Therefore, the ECU 40 performs neutral control which does not affect the rotational speed and rotational acceleration of the driving wheels 19 (step 130), and then terminates the interruption.

Now the neutral control in step 130 will be described referring to FIG. 6. The ECU 40 reads data about the engine speed (NE) and acceleration pedal angle (ACCP) based on the detection signals from the engine sensor 16 and the pedal sensor 30 (step 131). The ECU 40 computes the target rotational acceleration of the engine 1 (NEAt) from a function f(ACCP, NE) having the engine speed (NE) and the acceleration pedal angle (ACCP) as its parameters (step 132). In other words, the target engine rotational acceleration (NEAt) is calculated in accordance with the gap between the acceleration pedal angle (ACCP) that reflects the driver's intention, and the engine speed (NE) at that time. The function f(ACCP, NE) has the following two characteristics:

1) As the acceleration pedal angle (ACCP) increases, the greater the target acceleration (NEAt) increases; and
2) As the engine speed (NE) increases, the target acceleration (NEAt) decreases.

The ECU 40 calculates the difference between the engine speed (NE) read in the current interruption, and the old engine speed (NEOLD) acquired in the previous interruption, and sets the computation result as the actual engine rotational acceleration (NEA) (step 133). The engine speed (NE) read in the current interruption is set as an old engine speed (NEOLD) which will be used in the next interruption process (step 134).

Then, the ECU 40 determines if the target engine rotational acceleration (NEAt) is equal to, or greater than the actual engine rotational acceleration (NEA) (step 135). When the target acceleration (NEAt) is equal to, or greater than the actual acceleration (NEA), the ECU 40 drives the DC motor 9 to open the throttle valve 8 by a predetermined amount (step 137). When the target acceleration (NEAt) is smaller than the actual acceleration (NEA), the ECU 40 drives the DC motor 9 to reduce the opening of the throttle valve 8 by a predetermined amount (step 137). After step 136 or 137, the ECU 40 returns to the throttle valve control routine, from the neutral control routine, and terminates the interruption process. In this manner, the actual rotational acceleration of the engine 1 is controlled to be the target engine rotational acceleration (NEAt) through the opening control of the throttle valve 8, without being affected by the rotational conditions of the driving wheels 19.

According to the present embodiment, with the drive power of the activated engine 1 being transmitted to both driving wheels 19, the power of the engine 1 is controlled by the opening control of the throttle valve 8, in such a manner that the actual wheel rotational acceleration (A$\omega$) becomes the target wheel rotational acceleration (At), which was calculated on the basis of a function containing the acceleration pedal angle (ACCP) as one parameter. The rotational acceleration of the driving wheels 19 is therefore always adjusted in accordance with the amount of thrust power on, or variations in the position of the acceleration pedal 29. That is, the rotational acceleration of the driving wheels 19 is always related to the amount of the thrust power on the acceleration pedal 29.

For instance, if slippage of the driving wheels 19 occurs, and the driver varies the thrust on the acceleration pedal 29, the rotational acceleration of the driving wheels 19 is adjusted accordingly. The adjustment of the rotational acceleration controls the increase of the rotational speed of the driving wheels 19.

Therefore, even when slip occurs, the driver can intentionally control the rotational acceleration and rotational speed of the driving wheels 19. This will increase the driver's comfort level. Although the rotational acceleration of the driving wheels 19 is variable, neither the rapid acceleration nor the unexpected slippage of the driving wheels 19 would occur, as long as the thrust power on the acceleration pedal 29 is proper. According to the present embodiment, light thrusting on the acceleration pedal 29 slightly accelerates the rotation of the driving wheels, regardless of the slippery conditions. Similarly, additional further thrusting on the acceleration pedal 29 will further accelerate the rotation of the driving wheels 19.

Figure 5:
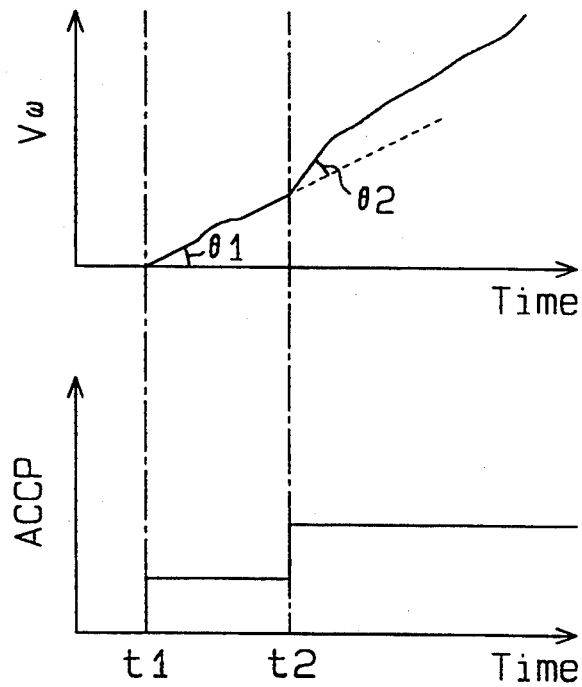

The control characteristic in this embodiment is illustrated in FIG. 5. FIG. 5 shows a time-dependent change in the actual wheel rotational speed (V$\omega$), with respect to a change in the acceleration pedal angle (ACCP). As the acceleration pedal angle (ACCP) increases step by step at times t1 and t2, the wheel rotational speed (V$\omega$) gradually rises, and the inclination $\Theta1$, $\Theta2$ indicates that the wheel rotational speed (V$\omega$) increases at times t1 and t2. The value of the inclination $\Theta1$ or $\Theta2$ is equivalent to the wheel rotational acceleration (A$\omega$) at that time (t1 or t2). The driver's intention to accelerate the wheel rotation is reflected on the amount of the thrust power on the acceleration pedal 29 (i.e., the acceleration pedal angle (ACCP)). Referring to FIG. 5, as the inclination of the graph varies in synchrony with changes in the acceleration pedal angle (ACCP), the driver's wish to accelerate is fully satisfied.

According to this embodiment, the function f(ACCP, V$\omega$, $\mu$, NS) for computing the target wheel rotational acceleration (At), is determined so as to increase the target acceleration (At) as the acceleration pedal angle (ACCP) increases, and to decrease the target acceleration (At) as the wheel rotational speed (V$\omega$) increases. If the thrust on the acceleration pedal 29 remains constant, as the wheel rotational speed (V$\omega$) increases, the target acceleration (At) decreases. Accordingly, as the rotational speed of the driving wheels 19 increases, an increase in the rotational acceleration is gradually decreased by the opening control of the throttle valve 8.

Therefore, even if the rotational speed of the driving wheels 19 were high, the driver can easily control the rotational acceleration of the driving wheels 19. That is, the rotation of the driving wheels 19 is accelerated as a function of thrust on the acceleration pedal 29. As the rotational speed increases, the rotational acceleration becomes gradually decreases, so that the rotational acceleration is easily controlled by the driver. This will give the feeling of driving along a highway having a high friction coefficient ($\mu$). Such a high friction coefficient ($\mu$) makes the acceleration-oriented slippage difficult to occur. The driver's feeling of the acceleration becomes smaller as the velocity of the vehicle increases, even if the acceleration pedal 29 is manipulated in the same way. This feature provides the driver with a desirable driving feeling.

Further, according to the present embodiment, the function f(ACCP, V$\omega$, $\mu$, NS), for computing the target wheel rotational acceleration (At), is determined so that the target acceleration (At) is computed to be smaller as the coefficient of the road surface friction ($\mu$) becomes smaller. When slippage is likely to occur, the rotational acceleration of the driving wheels 19 becomes smaller relative to the amount of the thrust power on the acceleration pedal 29. For this reason, further thrusting of the acceleration pedal 29 is required in order to acquire the desired rotational acceleration. This however means that the rotational acceleration of the driving wheels 19 can be finely controlled while reflecting the driver's intention, even under the conditions in which slippage is likely to occur. This fine control of the rotational acceleration is effective particularly in an area where the acceleration pedal angle (ACCP) is small. The function f(ACCP, V$\omega$, $\mu$, NS) according to the present embodiment is determined so as to make the target wheel rotational acceleration (At) smaller, as the number of speeds (NS) of the manual shift transmission 21 increases. As the number of speeds (NS) increases, changes in the rotational acceleration of the driving wheels become smoother, when the thrust on the acceleration pedal 29 varies. This can accomplish a smoother control on the rotational acceleration of the driving wheels 19 in accordance with the number of speeds (NS), thus providing the driver with a more natural and smoother increase or decrease of the acceleration.

The engine power is controlled such that when the drive power of the engine 1 is not transmitted to both driving wheels 19, the actual engine rotational acceleration (NEA) becomes the target engine rotational acceleration (NEAt), which is calculated on the basis of the acceleration pedal angle (ACCP) and the engine speed (NE). When the racing of the engine 1 is done under the condition that the drive power is not transmitted to the driving wheels 19, the engine speed (NE) is controlled according to the variations in the position of the acceleration pedal 29, thus allowing the engine speed (NE) to smoothly increases. The engine 1 can rev up smoothly even at the time of racing.

If, no drive-power is transmitted to the driving wheels 19, a slight thrust on the acceleration pedal 29 will rapidly increase the engine speed (NE). That is, even if the target wheel rotational acceleration (At) is set by manipulating the acceleration pedal 29, the drive power will not be transmitted to the driving wheels 19 from the engine 1. Thus, the opening of the throttle valve 8 does not cause an increase in the actual wheel rotational acceleration (Aω). As the angle of the throttle valve 8 increases, the engine speed (NE) rapidly rises. Such rapid rise of the in speed gives a feeling of discomfort to the driver. According to this embodiment, however, such a problem will not arise because of the above-described neutral control performed when no drive power is transmitted to the driving wheels 19.

Further, the function f(ACCP, NE) is determined so as to make the target engine rotational acceleration (NEAt) smaller, as the engine speed (NE) increases. If the thrust on the acceleration pedal 29 remains constant, as the engine speed (NE) increases, the target acceleration (NEAt) becomes smaller. As the engine speed (NE) increases, the engine rotational acceleration increases at a lower rate. Therefore, even if the engine 1 rotates at high speeds, the driver can easily control the engine rotational acceleration.

(Second Embodiment)

A throttle valve controller according to a second embodiment of the present invention will now be described referring to FIG. 7.

Figure 7:
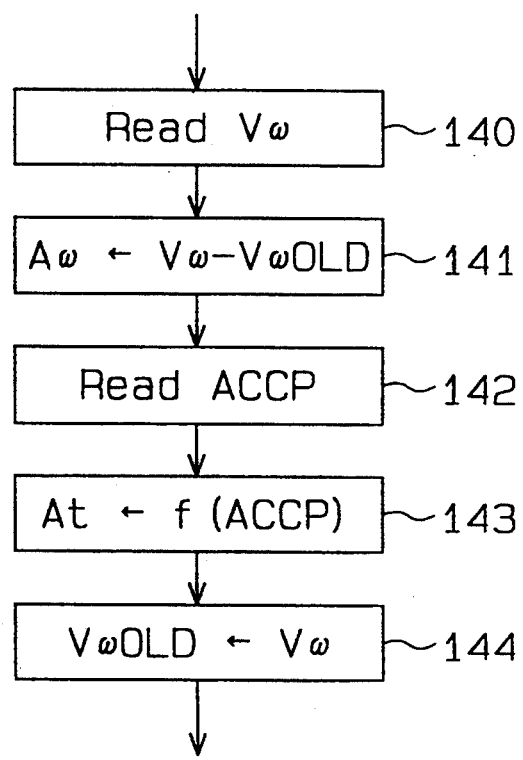
FIG. 7 is a flowchart illustrating part of a throttle valve control routine according to a second embodiment of the present invention.

According to the second embodiment, steps 120 to 124 in the throttle valve control routine (FIG. 3) of the first embodiment are replaced with steps 140 to 144 shown in FIG. 7. To avoid redundancy, the common steps of the control routine will not be described again.

When the clutch 20 is on, and the drive power is transmitted to both driving wheels 19 from the engine 1, the ECU 40 reads data about the wheel rotational speed (Vω) based on the detection signal from the wheel rotation sensor 28 (step 140). Next, the ECU 40 calculates the difference between the recently read wheel rotational speed (Vω), and a wheel rotational speed (VωOLD), which is the speed at the time of the previous interruption control, and sets the result of the computation as the actual wheel rotational acceleration (Aω) (step 141).

The ECU 40 then reads data about the acceleration pedal angle (ACCP), based on the detection signal from the pedal sensor 30 (step 142). Thereafter, the ECU 40 computes a target wheel acceleration value (At), based on a function f(ACCP) having the acceleration pedal angle (ACCP) as its parameter (step 143). In other words, the target acceleration value for the driving wheels 19 is calculated in accordance with the acceleration pedal angle (ACCP), which reflects the driver's intention. The function f(ACCP) is such that the target wheel rotational acceleration (At) increases as the acceleration pedal angle (ACCP) increases.

After computing the target rotational acceleration, the ECU 40 sets the wheel rotational speed (Vω), which is read in the current interruption, as an old wheel rotational speed (VωOLD). The stored value of (VωOLD) will be used in the next interruption (step 144). Thus, the power of the engine 1 is controlled, based on the opening control of the throttle valve 8, in such a way that the actual wheel rotational acceleration (Aω) becomes the target wheel rotational acceleration (At) computed based on the acceleration pedal angle (ACCP).

The rotational acceleration of the driving wheels 19 is always adjusted according to the thrust on the acceleration pedal 29, regardless of the slippage of the driving wheels 19 on the road surface. In other words, the rotational acceleration of the driving wheels 19 remains correlated to the thrust on, or variations in the position of the acceleration pedal 29. Accordingly, even when slippage occurs, the driver can control the rotational acceleration and rotational speed of the driving wheels 19, as intended. This will give the drive a sense of comfort and control over the vehicle.

(Third Embodiment)

A throttle valve controller according to a third embodiment of the present invention will now be described referring to FIGS. 8 and 9. For brevity, the following description will only emphasize the distinguishing features between the first and third embodiments.

Figure 8:
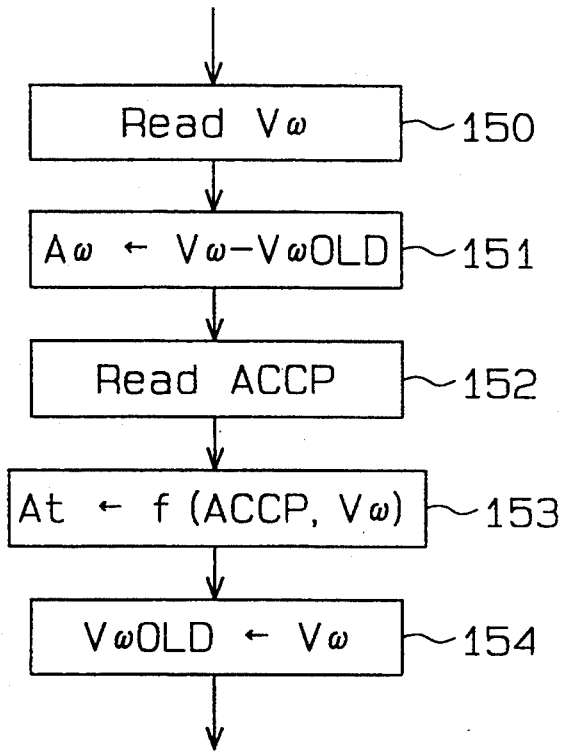
FIG. 8 is a flowchart illustrating part of a throttle valve control routine according to a third embodiment of the present invention.
Figure 9:
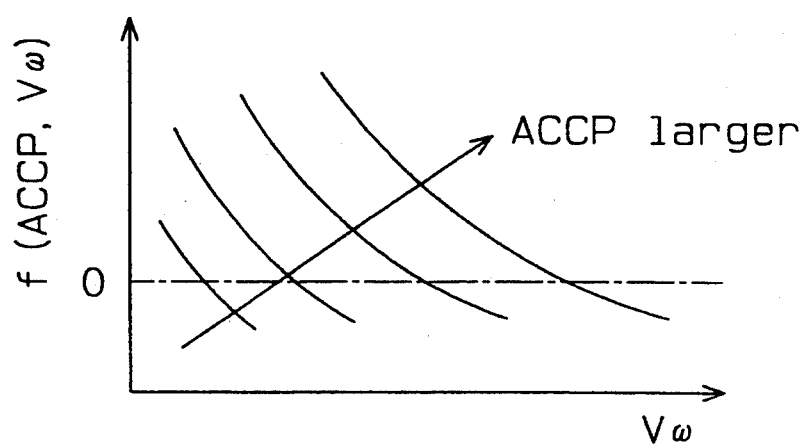
FIG. 9 is a two dimensional graph showing the relationship between the acceleration pedal angle and the wheel rotational speed, according to the third embodiment of FIG. 8.

According to the third embodiment, steps 120 to 124, in the throttle valve control routine (FIG. 3) of the first embodiment, are replaced by steps 150 to 154 shown in FIG. 8. To avoid redundancy, the common steps of the control routine will not be described again.

When the clutch 20 is on and the drive power is transmitted to both driving wheels 19 from the engine 1, the ECU 40 reads data about the wheel rotational speed (Vω) based on the detection signal from the wheel rotation sensor 28 (step 150). Next, the ECU 40 calculates the difference between the recently read wheel rotational speed (Vω), and a wheel rotational speed (VωOLD). (VωOLD) is the speed at the time of the previous interruption control. The ECU 40 sets the result of the computation as the actual wheel rotational acceleration (Aω) (step 151).

The ECU 40 then reads data about the acceleration pedal angle (ACCP), based on the detection signal from the pedal sensor 30 (step 152). The ECU 40 computes a target wheel acceleration value (At), based on a function f(ACCP, Vω), as a function of the acceleration pedal angle (ACCP) and wheel rotational speed (Vω) (step 153). In other words, the target acceleration value for the driving wheels 19 is calculated in accordance with the acceleration pedal angle (ACCP) that reflects the driver's intention, and the current wheel rotational speed (Vω). As is apparent from FIG. 9, the function f(ACCP, Vω) is set in such a way to increase the target wheel rotational acceleration (At), as the acceleration pedal angle (ACCP) increases, and to decrease the target acceleration (At), as the wheel rotational speed (Vω) increases.

After computing the target rotational acceleration, the ECU 40 sets the wheel rotational speed (Vω), which is read in the current interruption, as an old wheel rotational speed (VωOLD). The stored value of (VωOLD) will be used in the next interruption (step 154).

Therefore, in this embodiment, because of the above-described characteristic of the function f(ACCP, Vω), the rotational acceleration of the driving wheels 19 is always controlled in relation to the thrust on, or variations in the position of the acceleration pedal 29, regardless of the function between the driving wheels 19 and the road surface. Accordingly, even when slippage occurs, the driver can control the rotational acceleration and rotational speed of the driving wheels 19, as intended. In addition, according to this embodiment, if the thrust on the acceleration pedal 29 remains constant, as the wheel rotational speed (Vω) increases, the target wheel rotational acceleration (At) decreases. As the wheel rotational speed increases, the wheel rotational acceleration increases at a lower rate. As a result, even when the driving wheels 19 are rotating at high speeds, the driver can easily control the rotational acceleration of the driving wheels 19.

(Fourth Embodiment)

A throttle valve controller according to a fourth embodiment of the present invention will now be described referring to FIGS. 10 and 11. For brevity, the following description will emphasize the distinguishing features between the first and fourth embodiments.

Figure 10:
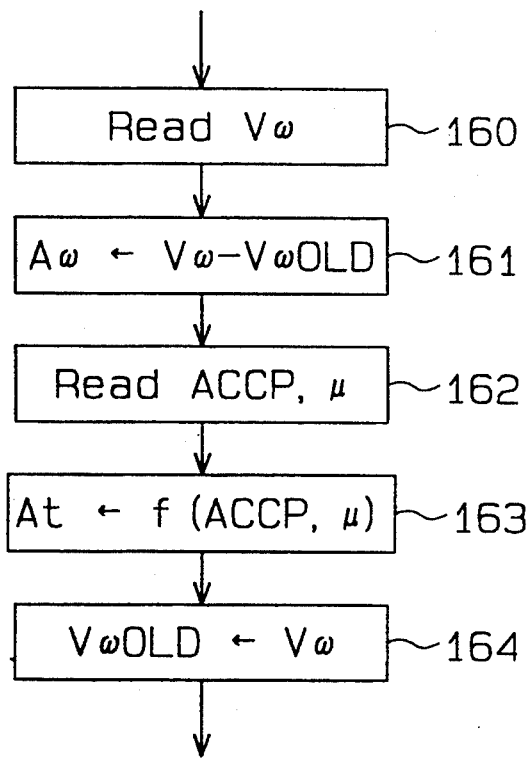
FIG. 10 is a flowchart illustrating part of a throttle valve control routine according to a fourth embodiment of the present invention.
Figure 11:
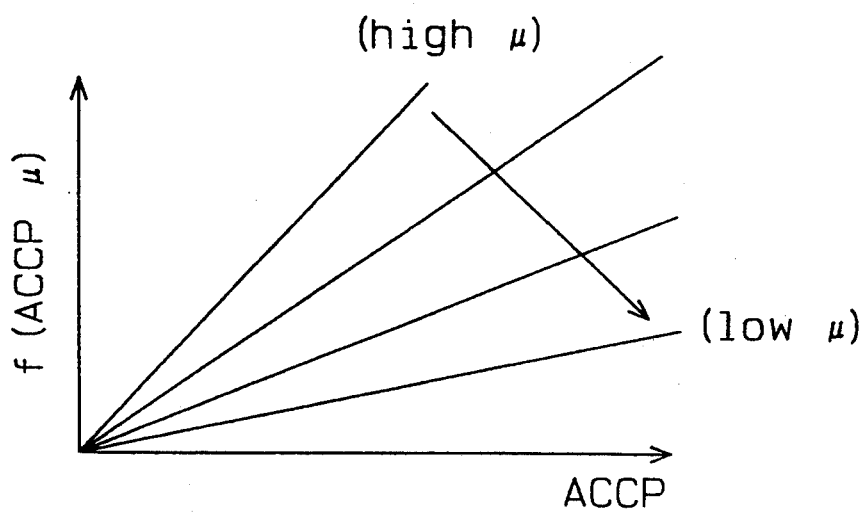
FIG. 11 is a graph showing the relationship between the acceleration pedal angle and the coefficient of road friction ($\mu$), according to the fourth embodiment of FIG. 10.

According to the fourth embodiment, steps 120 to 124, in the throttle valve control routine (FIG. 3) of the first embodiment are replaced with steps 160 to 164 shown in FIG. 10. To avoid redundancy, the common steps of the control routine will not be described again.

When the clutch 20 is on and the drive power is transmitted to both driving wheels 19 from the engine 1, the ECU 40 reads data about the wheel rotational speed (Vω) based on the detection signal from the wheel rotation sensor 28 (step 160). Next, the ECU 40 calculates the difference between the recently read wheel rotational speed (Vω) and a wheel rotational speed (VωOLD). (VωOLD) is the speed at the time of the previous interruption control. The ECU 40 sets the result of the computation as the actual wheel rotational acceleration (Aω) (step 161).

The ECU 40 then reads data about the acceleration pedal angle (ACCP) and the road friction coefficient (μ) (step 162). The road friction coefficient (μ) is an estimated value acquired through a computation that is carried out according to a separate calculation program for dividing the actual throttle angle TA based on the detection signal from the throttle sensor 10, by the wheel rotational acceleration (Aω).

The ECU 40 computes a target wheel acceleration value (At), based on a function f(ACCP, μ) having the acceleration pedal angle (ACCP) and the road friction coefficient (μ) as its parameters (step 163). In other words, the target acceleration value for the driving wheels 19 is calculated in accordance with the acceleration pedal angle (ACCP) that reflects the driver's intention, and the road friction coefficient (μ) that provides an indication regarding the road surface condition. As is apparent from FIG. 11, the function f(ACCP, μ) is determined so as to make the target wheel rotational acceleration (At) greater as the acceleration pedal angle (ACCP) increases. The ECU 40 decreases the target acceleration (At) as the road friction coefficient (μ) decreases.

After computing the target rotational acceleration, the ECU 40 sets the wheel rotational speed (Vω), which is read in the current interruption as an old wheel rotational speed (VωOLD). The stored value of (VωOLD) will be used in the next interruption (step 164).

Therefore, in this embodiment, because of the above-described characteristic of the function f(ACCP, μ), the rotational acceleration of the driving wheels 19 is always controlled in relation to the thrust on the acceleration pedal 29, regardless of the friction or slippage between the driving wheels 19 on the road surface. Accordingly, even when slippage occurs, the driver can control the rotational acceleration and rotational speed of the driving wheels 19, as intended.

In addition, according to this embodiment, as the road surface becomes more slippery (the coefficient of road friction (μ) becomes smaller), the target wheel rotational acceleration (At) decreases. Therefore as slippage becomes more likely to occur, the rotational acceleration of the driving wheels 19 decreases, relative to the thrust on the acceleration pedal 29. For this reason, further thrusting of the acceleration pedal 29 is required in order to obtain the desired rotational acceleration. This however means that the rotational acceleration of the driving wheels 19 can be finely controlled while reflecting the driver's intention, even under the conditions in which slippage is likely to occur. Fine and effective control of the rotational acceleration becomes possible, particularly when the acceleration pedal angle (ACCP) is small.

In an another modification according to this embodiment, the function f(ACCP, μ) may be determined so as to make the target acceleration (At) greater as the road friction coefficient (μ) decreases.

(Fifth Embodiment)

A throttle valve controller according to a fifth embodiment of the present invention will be described referring to FIGS. 12 and 13. For brevity, the following description of the fifth embodiment will only emphasize the distinguishing features between the first and fifth embodiments.

Figure 12:
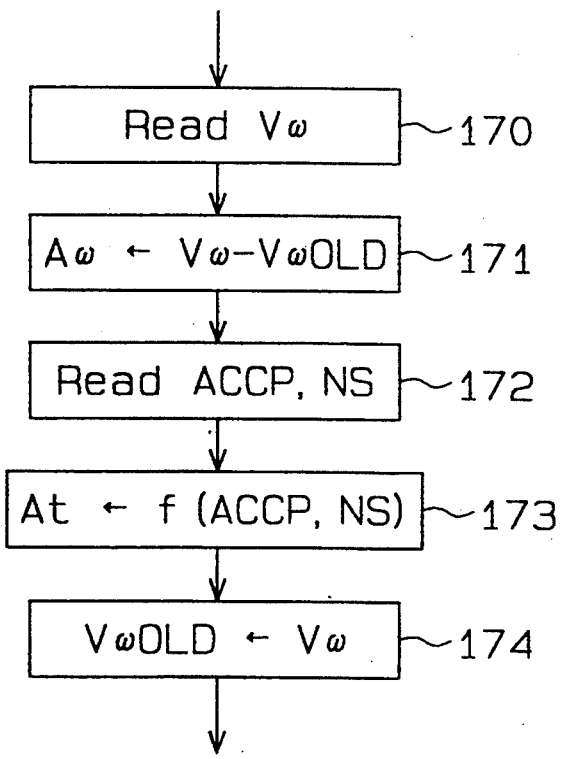
FIG. 12 is a flowchart illustrating part of a throttle valve control routine according to a fifth embodiment of the present invention.
Figure 13:
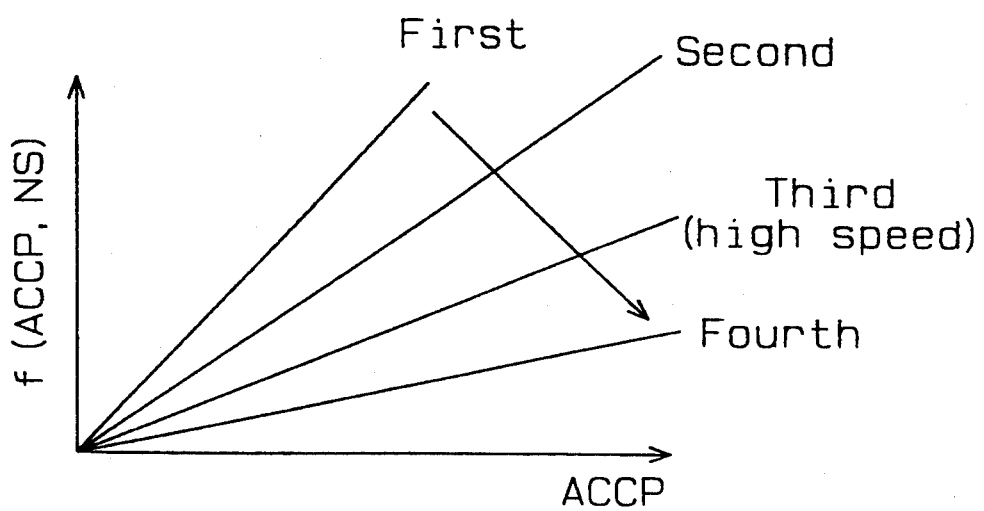
FIG. 13 is a graph showing the relationship between the acceleration pedal angle and the number of speeds, according to the fifth embodiment of FIG. 12.

According to the fifth embodiment, steps 120 to 124 in the throttle valve control routine (FIG. 3) of the first embodiment are replaced with steps 170 to 174 shown in FIG. 12. To avoid redundancy, the common steps of the control routine will not be described again.

When the clutch 20 is on and the drive power is transmitted to both driving wheels 19 from the engine 1, the ECU 40 reads data about the wheel rotational speed (Vω), based on the detection signal from the wheel rotation sensor 28 (step 170). Next, the ECU 40 calculates the difference between the recently read wheel rotational speed (Vω) and a wheel rotational speed (VωOLD). (VωOLD) is the speed at the time of the previous interruption control. The ECU 40 sets the result of the computation as the wheel rotational acceleration (Aω) (step 171).

The ECU 40 then reads data about the acceleration pedal angle (ACCP) and the number of transmission speeds (NS) selected by the manual shift transmission 21, as a function of the detection signal from the shift position sensor 27 (step 172).

The ECU 40 computes a target wheel acceleration value (At), based on a function f(ACCP, NS) having the acceleration pedal angle (ACCP) and the number of transmission speeds (NS) as its parameters (step 173). In other words, the target acceleration value for the driving wheels 19 is calculated as a function of the acceleration pedal angle (ACCP), which reflects the driver's intention, and the number of transmission speeds (NS) selected at that time. As is apparent from FIG. 13, the function f (ACCP, NS) is determined so as to increase the target wheel rotational acceleration (At), as the acceleration pedal angle (ACCP) increases, and to decrease the target acceleration (At), as the number of speeds (NS) increases.

After computing the target rotational acceleration, the ECU 40 sets the wheel rotational speed (Vω), which is read in the current interruption as an old wheel rotational speed (VωOLD). (VωOLD) will be used in the next interruption (step 174).

Therefore, in this embodiment, because of the above-described characteristic of the function f(ACCP, NS), the rotational acceleration of the driving wheels 19 is always controlled in relation to the thrust on the acceleration pedal 29, regardless of the friction or slippage between the driving wheels 19 and the road surface. Accordingly, even when slippage occurs, the driver can control the rotational acceleration and rotational speed of the driving wheels 19, as intended.

In addition, according to this embodiment, as the number of transmission speeds (NS) increases, changes in the rotational acceleration of the driving wheels 19 become smoother, when the thrust on the acceleration pedal 29 varies. As a result, the rotational acceleration of the driving wheels 19 is smoothly controlled according to the selected number of transmission speeds (NS), thus providing the driver with a more natural and smoother variation in the acceleration.

(Sixth Embodiment)

Figure 14:
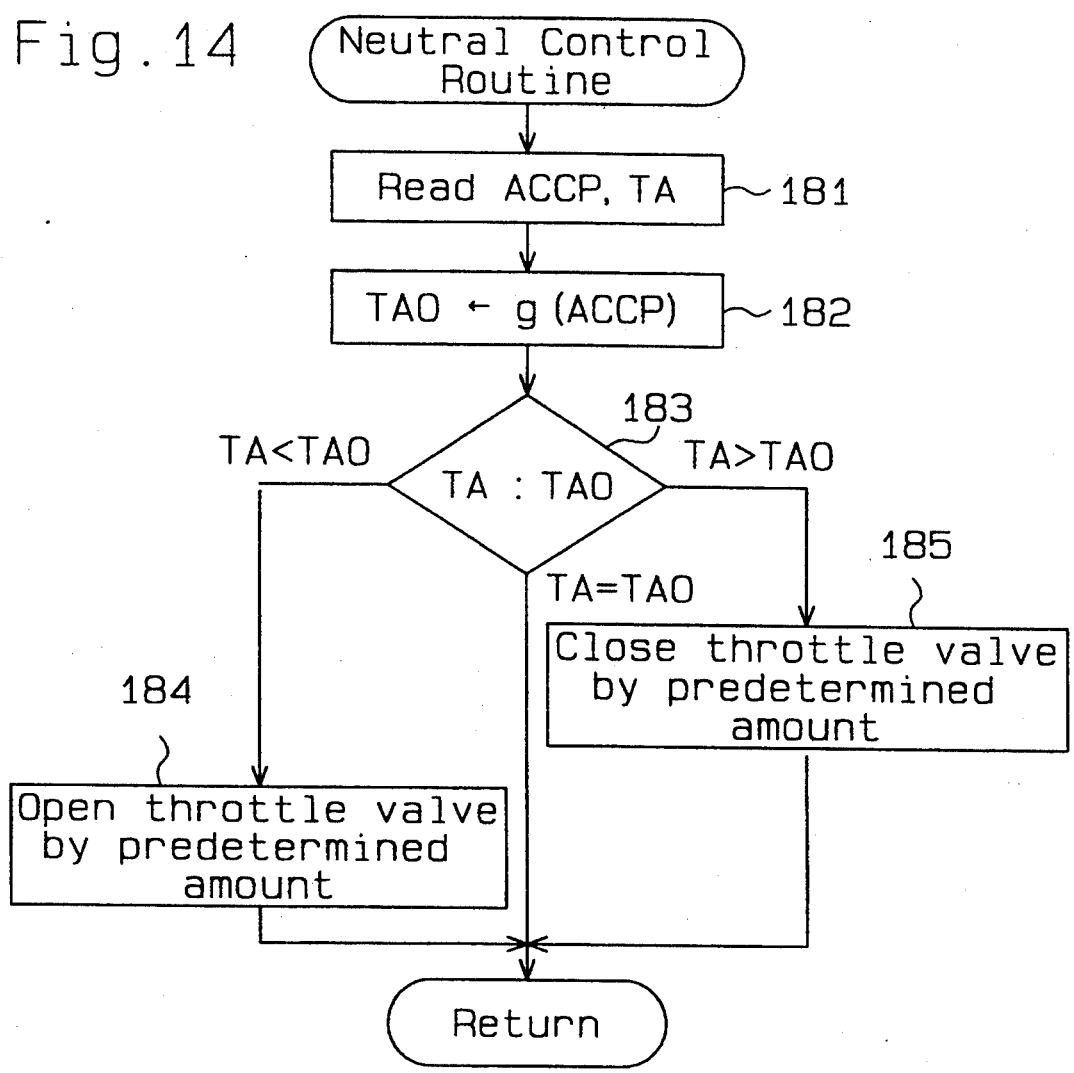
FIG. 14 is a flowchart illustrating a neutral control routine executed by the ECU, according to a sixth embodiment of the present invention.
Figure 15:
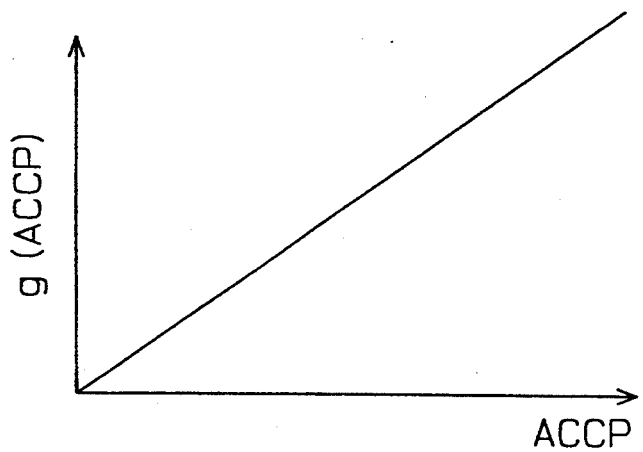
FIG. 15 is a graph showing the relationship between the acceleration pedal angle and the number of speeds, according to the sixth embodiment of FIG. 14.

A throttle valve controller according to a sixth embodiment of the present invention will be described referring to FIGS. 14 and 15. For brevity, the following description of the sixth embodiment will only emphasize the distinguishing features between the first and sixth embodiments. According to the sixth embodiment, another neutral control routine shown in FIG. 14 is used as a subroutine (step 130), in the throttle valve control routine (FIG. 3) of the first embodiment. To avoid redundancy, the common steps of the control routine will not be described again.

When the process enters the routine shown in FIG. 14, the ECU 40 reads data about the actual throttle angle (TA) and acceleration pedal angle (ACCP), based on the detection signals from the throttle sensor 10 and the pedal sensor 30 (step 181). The ECU 40 calculates a target throttle angle (TAO) based on a function g(ACCP), having the acceleration pedal angle (ACCP) as its only parameter (step 182). The function g(ACCP) is a function whose solution to the value of the acceleration pedal angle (ACCP) is specifically shown in FIG. 15.

Next, the ECU 40 compares the actual throttle angle (TA) with the target throttle angle (TAO) (step 183). When the actual throttle angle (TA) is smaller than the target throttle angle (TAO), the ECU 40 controls the DC motor 9 and causes it to open the throttle valve 8 by a predetermined amount (step 184). When the actual throttle angle (TA) is greater than the target throttle angle (TAO), the ECU 40 controls the DC motor 9, and causes it to reduce the opening of the throttle valve 8 by a predetermined amount (step 185). When the actual throttle angle (TA) is equal to the target throttle angle (TAO), or when the throttle valve control in step 184 or 185 is completed, the ECU 40 returns from that subroutine to the throttle valve control routine and terminates the interruption.

According to this embodiment, the actual number of revolutions of the engine 1 can be changed without being affected by the rotational conditions of the driving wheels 19. As a result, when the drive power is not transmitted to both driving wheels 19 from the engine 1, the throttle valve angle (TA) is controlled, via the DC motor 9, and is set equal to the target throttle angle (TAO), which is specifically determined according to the acceleration pedal angle (ACCP), for controlling the engine power output.

When the racing of the engine 1 is carried out under the condition that no drive power is transmitted to the driving wheels 19, the engine speed (NE) is adjusted as a function of the thrust on the acceleration pedal 29, for permitting the engine speed (NE) to increase promptly. This will smoothly rev up when the racing of the engine 1 is performed.

Although only six embodiments of the present invention have been described herein, it should be apparent to those skilled in the art that the present invention may be embodied in many other specific forms, without departing from the spirit or scope of the invention. Particularly, it should be understood that this invention may be embodied in the following manners.

Figure 6:
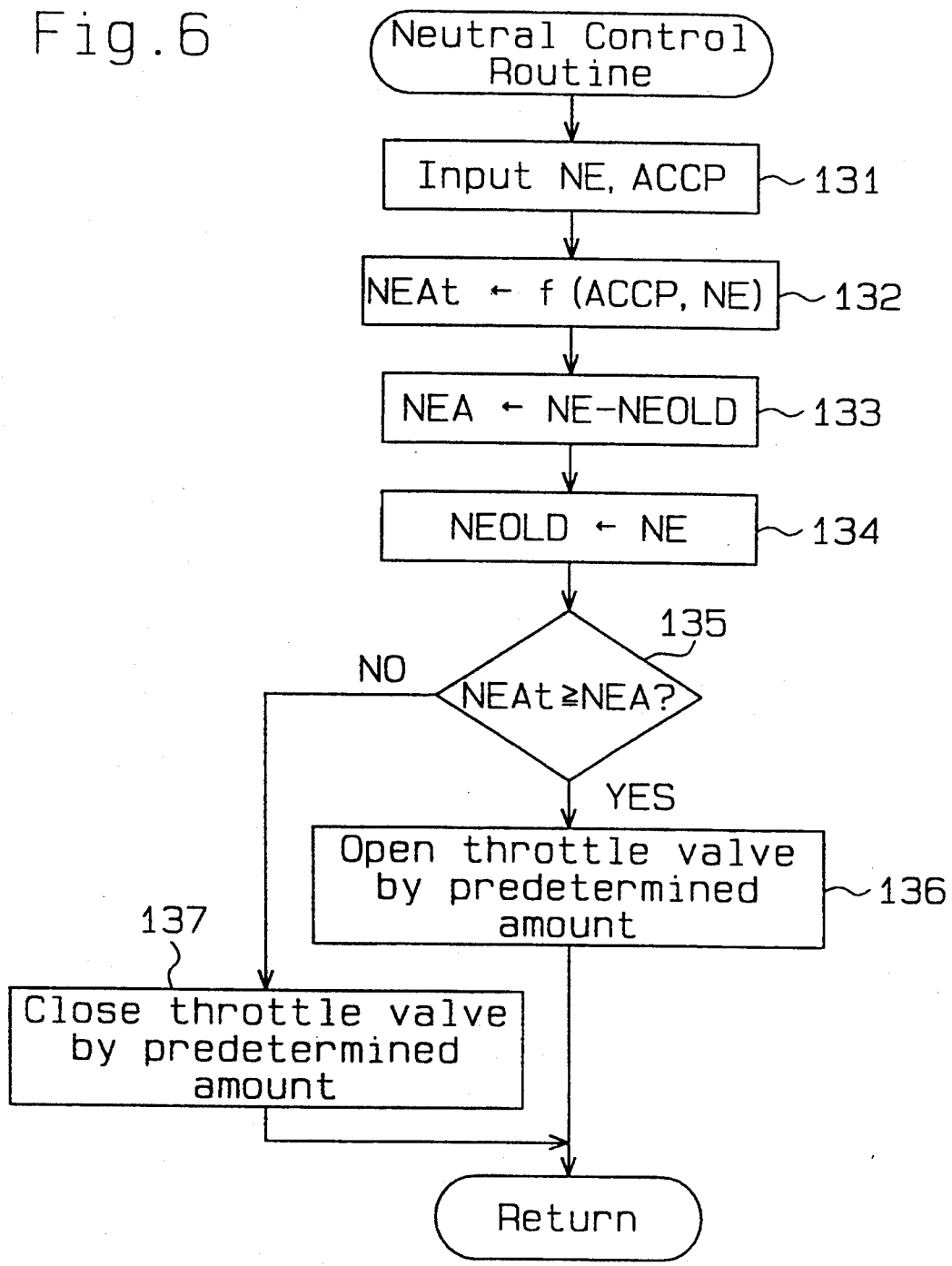

In the first embodiment, the target engine rotational acceleration (NEAt) is computed from the function f(ACCP, NE) having the engine speed (NE) and acceleration pedal angle (ACCP) as its parameters, in the neutral control routine shown in FIG. 6. Another function h(ACCP) having the acceleration pedal angle (ACCP) as its only parameter, may be used instead of the function f(ACCP, NE).

According to the foregoing six embodiments, the angle of the throttle valve 8 is controlled such that the actual rotational acceleration (Aω) of the driving wheels 19 is set equal to the target wheel rotational acceleration (At). Instead of using the target acceleration (At) of the driving wheels 19, the target rotational acceleration (NEAt) of the engine 1 may be computed, such that the angle of the throttle valve 8 can be controlled to set the actual engine rotational acceleration (NEA) equal to the target acceleration (NEAt).

In the first and fourth embodiments, the road friction coefficient (μ) is used to reflect the slippage conditions of the road surface. The slippage ratio between the driving wheels and the road surface, may be used as an index for slippage, instead of the road friction coefficient (μ). Although the DC motor 9 is used in the above six embodiments, a stepping motor may alternatively be used to control the throttle valve 8.

Although the present invention is applied to an engine system having only one throttle valve 8 of a linkless type, this invention may be embodied in an engine system which has an ordinary link type throttle valve that is linked to and moved in association with the acceleration pedal, and a linkless type throttle valve that is activated by a motor. For instance, the secondary throttle valve of a linkless type may be provided upstream or downstream of the main throttle valve of a link type. In this case, the angle of the secondary throttle valve is controlled within a range below the maximum open angle of the main throttle valve.

The thrust on the acceleration pedal 29 is detected by the pedal sensor 30 in the foregoing six embodiments. A manually operable acceleration lever may be provided on the steering wheel instead of using the acceleration pedal 29, so that the amount of the manipulation of this acceleration lever can be used as a control parameter.

Although the present invention is applied to a manual transmission vehicle equipped with the manual shift transmission 21, this invention may be applied to an automatic transmission vehicle.

Therefore, the present examples and embodiments are to be considered as illustrative and not restrictive, and the invention is not to be limited to the details given herein.

What is claimed is:

1. A throttle valve controller for use in conjunction with an engine system for a vehicle provided with driving wheels, the engine system including an engine connected to the driving wheels, a throttle valve disposed in an air-intake passage for regulating the air flow to the engine, and an adjustor controllable by a driver to regulate the engine power output, the controller comprising:
   valve driving means for activating the throttle valve;
   wheel acceleration detecting means for detecting the actual rotational angular acceleration of the driving wheels, and for outputting a signal indicative thereof;
   manipulation detecting means for detecting changes in the position of the adjustor, and for outputting a signal indicative of said changes, wherein the position of the adjustor is indicative of a desired additional acceleration of the driving wheels selected by the driver;
   target value calculating means for calculating a target acceleration value for the rotational angular acceleration of the driving wheels, as a function of said output signal from said manipulation detecting means; and
   drive control means for controlling said valve driving means such that the actual rotational angular acceleration of the driving wheels is set equal to said target acceleration value;
so that the driving wheels achieve the additional acceleration selected by the driver, irrespective of slippage between the driving wheels and a road.

2. The throttle valve controller according to claim 1, wherein said wheel acceleration detecting means includes:
   a wheel rotation sensor for detecting a wheel rotational angular speed, and for outputing a signal indicative thereof; and
   calculating means for calculating a wheel rotational angular acceleration, as a function of said output signal from said wheel rotation sensor.

3. The throttle valve controller according to claim 1 further comprising wheel speed detecting means for detecting the actual rotational angular speed of the driving wheels; and
   wherein said target value calculating means calculates a target acceleration value for the rotational angular acceleration of the driving wheels, as a function of said output signal from said manipulation detecting means and said wheel rotational angular speed, whereby said target acceleration value is increased as said output signals from said manipulation detecting means increases, and is decreased as said wheel rotational angular speed increases.

4. The throttle valve controller according to claim 3, wherein said wheel speed detecting means includes a wheel rotation sensor.

5. The throttle valve controller according to claim 1 further comprising slippage detecting means for detecting friction between the driving wheels and the road surface; and
   wherein said target value calculating means includes target value compensating means for compensating said target acceleration value, based on said friction, whereby said compensated target acceleration value decreases as said friction increases.

6. The throttle valve controller according to claim 5, wherein said slippage detecting means includes:
   a throttle sensor for detecting a throttle valve angle (TA);
   a wheel rotation sensor for detecting a wheel rotational angular speed (Vω); and
   calculating means for calculating a road friction coefficient ($\mu$), wherein said road friction coefficient is an index for slippage, and is based on said throttle valve angle (TA) and said wheel rotational angular speed (Vω).

7. The throttle valve controller according to claim 1 further comprising transmission level detecting means for detecting the number of transmission speeds, and for outputing a signal indicative thereof; and
   wherein said target value calculating means includes target value compensating means for compensating said target acceleration value, based on said output signal from said transmission level detecting means, whereby said target acceleration value is decreased as the number of transmission speeds increases.

8. The throttle valve controller according to claim 7, wherein said transmission speeds correspond to various positions of a shift lever; and
   wherein said transmission level detecting means includes a shift position sensor for detecting said shift lever positions.

9. The throttle valve controller according to claim 1 further comprising:
   wheel speed detecting means for measuring the actual rotational angular speed of the driving wheels;
   slippage detecting means for detecting friction between the driving wheels and a road surface; and
   transmission level detecting means for detecting the number of transmission speeds;
   wherein said target value calculating means calculates a target acceleration value for the rotational angular acceleration of the driving wheels, as a function of said output signals from said manipulation detecting means, said wheel speed detecting means, said slippage detecting means, and said transmission level detecting means, whereby said target acceleration value of the driving wheels increases as said output signals from said manipulation detecting means increases; decreases as said wheel rotational angular speed increases; decreases as friction decreases; and decreases as the number of transmission speeds increases.

10. The throttle valve controller according to claim 9, wherein said wheel speed detecting means includes a wheel rotation sensor;
   wherein said slippage detecting means includes a throttle sensor for detecting a throttle valve angle (TA), a wheel rotation sensor for detecting a wheel rotational angular speed (Vω), and calculating means for calculating a road friction coefficient ($\mu$), wherein said road friction coefficient is an index for slippage, based on said throttle valve angle (TA) and said wheel rotational angular speed (Vω);

wherein a shift lever is movable between a plurality of shift positions; and wherein said transmission level detecting means includes a shift position sensor for detecting the shift position of said shift lever.

11. The throttle valve controller according to claim 1, wherein said valve driving means includes a DC motor.

12. The throttle valve controller according to claim 1, wherein said adjustor includes an acceleration pedal; and wherein said manipulation amount detecting means includes an acceleration pedal sensor.

13. The throttle valve controller according to claim 1, wherein said target value calculating means includes a control unit having a central processing unit, a read only memory and a random access memory.

14. The throttle valve controller according to claim 1, wherein said drive control means includes a control unit having a central processing unit, a read only memory and a random access memory.

15. A throttle valve controller for use in conjunction with an engine system for a vehicle provided with driving wheels, the engine system including an engine, a coupling mechanism for selectively coupling the engine to, or disconnecting it from the driving wheels, a throttle valve disposed in an air-intake passage for regulating the air flow to the engine, and an adjustor controllable by a driver to regulate the engine power output, the controller comprising:

valve driving means for activating the throttle valve;

wheel acceleration detecting means for detecting the actual rotational angular acceleration of the driving wheels, and for outputting a signal indicative thereof;

manipulation detecting means for detecting changes in the position of the adjustor, and for outputting a signal indicative of said changes, wherein the position of the adjustor is indicative of a desired additional acceleration of the driving wheels selected by the driver;

target value calculating means for calculating a target acceleration value for the rotational angular acceleration of the driving wheels, as a function of said output signal from said manipulation detecting means;

coupling state detecting means for detecting whether the engine is connected to, or disconnected from the driving wheels via the coupling mechanism, and for generating a signal indicative of the coupling state;

drive control means for controlling said valve driving means as a function of said coupling state signal;

wherein when the engine is connected to the driving wheels by means of the coupling mechanism said drive control means controls said valve driving means such that the actual rotational angular acceleration of the driving wheels is set equal to said target acceleration value, and wherein, when the engine is disconnected from the driving wheels, said drive control means controls said valve driving means so that the actual rotational angular acceleration of the engine corresponds to the position of the adjustor.

16. The throttle valve controller according to claim 15, wherein said wheel acceleration detecting means includes:

a wheel rotation sensor for detecting a wheel rotational angular speed, and for outputting a signal indicative thereof; and calculating means for calculating a wheel rotational angular acceleration, as a function of said output signal from said wheel rotation sensor.

17. The throttle valve controller according to claim 15, wherein the coupling mechanism includes a clutch; and wherein said coupling state detecting means includes a clutch sensor for detecting the coupling state of said clutch.

18. The throttle valve controller according to claim 15 further comprising:

engine acceleration detecting means for detecting the rotational acceleration of the engine; and second target value calculating means for calculating a target engine rotational acceleration value (NEAt) as a function of said output signals from said manipulation detecting means; and wherein, when the engine is disconnected from the driving wheels by means of the coupling mechanism, said drive control means controls said valve driving means such that the actual engine rotational acceleration (NEA) is set equal to said target engine rotational acceleration value (NEAt).

19. The throttle valve controller according to claim 18, wherein said engine acceleration detecting means includes:

an engine sensor for counting the number of revolutions of the engine; and calculating means for calculating the rotational acceleration of the engine, based on the count by said engine sensor.

20. The throttle valve controller according to claim 15, wherein when the engine is disconnected from the driving wheels by the coupling mechanism, said drive control means controls said valve driving means to provide a throttle angle determined as a function of said output signals from said manipulation detecting means.

21. A throttle valve controller for use in conjunction with an engine system for a vehicle provided with driving wheels, the engine system including an engine, a clutch for selectively coupling the engine to, or disconnecting it from the driving wheels, a throttle valve disposed in an air-intake passage for regulating the air flow to the engine, and an adjustor controllable by a driver to regulate the engine power output, the controller comprising:

a motor for activating the throttle valve;

manipulation detecting means for detecting changes in the position of the adjustor, and for generating an output signal indicative of said changes, wherein the position of the adjustor, when the engine is coupled to the driving wheels, is indicative of a desired additional acceleration of the driving wheels selected by the driver and wherein, when the engine is not coupled to the driving wheels, the position of the adjustor is indicative of a desired additional acceleration of engine selected by the driver;

wheel speed detecting means for detecting the actual rotational angular speed of the driving wheels, and for generating an output signal indicative thereof;

wheel acceleration computing means for computing the actual rotational angular acceleration of the driving wheels as a function of said output signal from said wheel speed detecting means;

first target value calculating means for calculating a target acceleration value for the rotational angular acceleration of the driving wheels, as a function of said output signal from said manipulation detecting means;

engine speed detecting means for detecting the number of revolutions of the engine, and for generating an output signal indicative thereof;

engine acceleration calculating means for calculating an actual rotational acceleration of the engine, as a function of said output signal from said engine speed detecting means;

second target value calculating means for calculating a target engine rotational acceleration value, as a function of said output signal from said manipulation detecting means;

coupling state detecting means for detecting whether the engine is connected to, or disconnected from the driving wheels by means of the clutch, and for generating a signal indicative of the coupling state;

drive control means for controlling said valve driving means as a function of said coupling state signal;

wherein, when the engine is connected to the driving wheels by means of the clutch, said drive control means controls said motor such that the actual rotational angular acceleration of the driving wheels is set equal to said target acceleration value calculated by said first target value calculating means, and wherein, when the engine is disconnected from the driving wheels by the clutch, said drive control means controls said motor such that the actual engine rotational acceleration is set equal to said target engine rotational acceleration value calculated by said second target value calculating means, so that, when the engine is coupled to the driving wheels, the driving wheels achieve the additional acceleration selected by the driver, irrespective of slippage between the driving wheels and a road.

22. The throttle valve controller according to claim 21 further comprising:

a throttle sensor for detecting a throttle valve angle (TA);

frictional coefficient calculating means for calculating a road friction coefficient ($\mu$), as a function of said throttle valve angle (TA) and a wheel rotational angular speed, and for generating an output signal indicative thereof;

transmission level detecting means for detecting the number of transmission speeds of a transmission mechanism disposed between the engine and the driving wheels; and wherein said first target value calculating means calculates a target acceleration value for the rotational angular acceleration of the driving wheels, as a function of the following output signals generated by said manipulation detecting means, said wheel speed detecting means, and said transmission level detecting means, and said frictional coefficient calculating means, whereby said target acceleration value of the driving wheels increases as said output signal from said manipulation detecting means increases; decreases as said wheel rotating speed increases; decreases as the number of transmission speeds increases; and decreases as the road friction coefficient ($\mu$) decreases.

* * * * *